United States Patent [19]

Iio et al.

[11] Patent Number: 5,202,388

[45] Date of Patent: Apr. 13, 1993

[54] PROCESS FOR PRODUCING HYDROGENATION PRODUCT OF RING-OPENING POLYMER

[75] Inventors: Akira Iio, Yokkaichi; Noboru Oshima, Suzuka; Yosihiro Ohira, Yokkaichi; Masao Sakamoto, Yokkaichi; Hiroshi Oka, Yokkaichi, all of Japan

[73] Assignee: Japan Synthetic Rubber Co., Ltd., Tokyo, Japan

[21] Appl. No.: 800,231

[22] Filed: Nov. 29, 1991

[30] Foreign Application Priority Data

Nov. 30, 1990 [JP] Japan ............... 2-330269

[51] Int. Cl.$^5$ ............................. C08F 8/04
[52] U.S. Cl. .................... 525/338; 525/332.1; 525/339
[58] Field of Search .................... 525/338, 339

[56] References Cited

U.S. PATENT DOCUMENTS

| | | | |
|---|---|---|---|
| 2,319,271 | 5/1943 | Soday | 525/332.1 |
| 3,993,855 | 11/1976 | Kang | 525/332.1 |
| 4,113,930 | 9/1978 | Moczygemba | 525/332.1 |
| 4,816,525 | 3/1989 | Rempel et al. | |
| 5,053,471 | 10/1991 | Goto et al. | |
| 5,115,041 | 5/1992 | Tenney et al. | 525/332.1 |

FOREIGN PATENT DOCUMENTS

| | | |
|---|---|---|
| 0298386 | 1/1989 | European Pat. Off. |
| 64-45403 | 2/1989 | Japan |
| 64-45404 | 2/1989 | Japan |

Primary Examiner—Bernard Lipman
Attorney, Agent, or Firm—Oblon, Spivak, McClelland, Maier & Neustadt

[57] ABSTRACT

A process for producing a hydrogenation product of ring-opening polymer by hydrogenating, in the presence of a hydrogenation catalyst, the non-aromatic carbon-to-carbon double bond present in a ring-opening polymer obtained by subjecting to ring-opening polymerization at least one norbornene derivative represented by general formula (I):

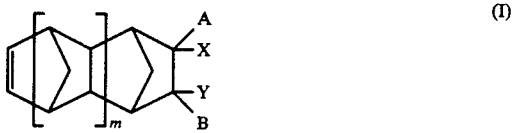

wherein A and B independently represent hydrogen atoms or hydrocarbon groups having 1-10 carbon atoms, X and Y independently represent hydrogen atoms, halogen atoms or monovalent organic groups, and m is 0 or 1, alone or in combination with a monomer copolymerizable with said norbornene derivative, characterized by using, as the hydrogenation catalyst, a ruthenium compound represented by general formula (II):

$$RuH_kQ_nT_pZ_q \qquad (II)$$

wherein Q represents a halogen atom, T represents at least one atomic group selected from the group consisting of CO, NO and $CH_3COCH_2COCH_3$, Z represents $PR^1R^2R^3$ ($R^1$, $R_2$ and $R^3$ independently represent alkyl groups, alkenyl groups or phenyl groups), k is 1 or 2, n is 0, 1 or 2, p is 1 or 2, and q is 2 or 3. This process enables hydrogenation with a small amount of a hydrogenation catalyst in a very high hydrogenation degree even when the polymer to be hydrogenated is a ring-opening polymer of a specific tetracyclodeodecene compound, and enables the hydrogenation reaction to be carried out easily.

13 Claims, No Drawings

PROCESS FOR PRODUCING HYDROGENATION PRODUCT OF RING-OPENING POLYMER

The present invention relates to a process for producing a hydrogenation product of ring-opening polymer.

Hydrogenation products of ring-opening polymers of norbornene derivatives (the ring-opening polymers include ring-opening copolymers, and the same applies hereinafter) are useful as a transparent resin having excellent optical properties and heat resistance. Hydrogenation products of various ring-opening polymers and processes for the production thereof have been proposed.

As the hydrogenation products of such ring-opening polymers, there is known, for example, a hydrogenation product of ring-opening polymer, which is obtained by subjecting 8-methyl-8-methoxytetracyclo[4.4.0.1$^{2,5}$.1$^{7,10}$]-3-dodecene to ring-opening polymerization in the presence of a polymerization catalyst selected from compounds of transition metals such as W, Mo, Re, Ti and the like, or a polymerization catalyst consisting of a combination of said transition metal and an organometallic compound of a metal such as Li, Mg, Al, Sn or the like to form a ring-opening polymer and then hydrogenating the polymer.

Meanwhile, the known process for hydrogenating a polymer having carbon-to-carbon double bond(s) include:

(1) a process in which a so-called Ziegler type homogeneous catalyst is used which consists of a combination of an organic acid salt or acetylacetonate of Ti, Co, Ni or the like with an organometallic compound of a metal such as Li, Mg, Al, Sn or the like, (2) a process in which a supported noble metal catalyst is used which consists of a noble metal such as palladium, platinum, ruthenium, rhodium or the like supported on a carrier such as carbon, alumina, silicaalumina, diatomaceous earth or the like, (3) a process in which a solid catalyst comprising a base metal such as nickel or the like is used and (4) a process in which noble metal (e.g. Rh or Ru) complex catalyst is used.

None of these processes, however, are satisfactory in industry. That is, the process (1), as compared with the process (2) wherein a heterogeneous reaction is conducted, has such an advantage that the reaction proceeds with a small amount of catalyst under mild hydrogenation conditions of low reaction temperature and low hydrogen pressure. In the process (1), however, the catalyst is easily deactivated by air, water or other polar compounds, and hence, it becomes necessary to remove, in advance, substances which cause the deactivation or to conduct the hydrogenation reaction in the state that the system is sufficiently shielded from air and water, so that the handling is complicated. Moreover, in the process (1), since the reactivity is low when a solvent of high polarity is used, there is a limitation on solvents which can be used.

Especially when a polar group-containing polymer such as polar group-containing norbornene polymer or the like is hydrogenated, it is actually difficult to select a solvent required therefor, namely a solvent, the solubility of said polymer in which is sufficiently high and in which solvent sufficiently high reaction activity is maintained. However, the use of such a solvent is virtually impossible for the reason mentioned above.

The process (2) is advantageous in that the hydrogenation degree is not low even when a polar group-containing polymer is hydrogenated, that the reaction activity is not greatly affected even when water is present in the hydrogenation reaction system, and that the catalyst present in the system can be easily recovered merely by filtration. The process (2), however, have such industrially detrimental disadvantages that the catalyst is required to be used in a large amount in order to obtain a high hydrogenation degree and that the catalyst life is very short and, hence, for example, when the hydrogenation reaction is conducted batchwise and the catalyst is reused, the hydrogenation degree at the second use of catalyst is greatly lowered as compared with that at the first use of catalyst.

The process (3) is disadvantageous in that although an inexpensive catalyst is used, no sufficient hydrogenation degree is obtained in the hydrogenation of polymers.

The process (4) are disadvantageous in that the catalyst used is expensive, the activity thereof is not so sufficiently high, and the recovery and reuse of the catalyst is difficult, resulting in a very high production cost.

As stated above, none of the above processes are fully suitable for industrial application. Therefore, various catalyst systems are currently selected depending upon the properties of desired hydrogenation product of polymer or other requirements.

With respect to, for example, the process (4), there have been disclosed techniques each using a specific complex of Ru which is relatively inexpensive among noble metals (see Japanese Patent Application Kokai No. 64-45403, Japanese Patent Application Kokai No. 64-45404 and U.S. Pat. No. 4,816,525). These techniques are for the hydrogenation of a conjugated diene compound polymer; however, the above-mentioned hydrogenation catalysts cannot be deemed to have a sufficient activity from the viewpoint of industrial application. Accordingly, it is necessary to use said catalyst in an amount as large as, for example, about 800 ppm (in terms of Ru) of the polymer to be hydrogenated. Moreover, the concentration of the polymer solution used for hydrogenation must be maintained low. Therefore, the process (4) is not advantageous in any of these respects.

Thus, the known hydrogenation catalysts do not always exhibit a good catalytic activity, and the catalyst efficiencies actually obtained vary depending upon the type of polymer to be hydrogenated, the hydrogenation conditions, etc. Even when a catalyst gives a high hydrogenation degree in the case of a certain polymer, it cannot be expected that the same catalyst gives a similar hydrogenation degree in the case of other polymers.

Especially when the polymer to be hydrogenated is a ring-opening polymer of a tetracyclododecene compound having a large atomic group in the vicinity of the carbon-to-carbon double bond to be hydrogenated, a bulky tricyclodecane ring is present in the polymer, and therefore, it has been considered that steric hindrance is so great that it is difficult to achieve the hydrogenation in a high hydrogenation degree.

The object of the present invention is to provide a process for producing a hydrogenation product of ring-opening polymer which process enables one to hydrogenate even a ring-opening polymer of a specific tetracyclododecene compound having a polar group in a very high hydrogenation degree and to easily carry out said hydrogenation reaction.

According to the present invention, there is provided a process for producing a hydrogenation product of ring-opening polymer by hydrogenating, in the presence of a hydrogenation catalyst, the non-aromatic carbon-to-carbon double bonds present in a ring-opening polymer obtained by subjecting at least one norbornene derivative represented by general formula (I):

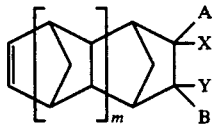
(I)

wherein A and B represent independently hydrogen atoms or hydrocarbon groups having 1-10 carbon atoms, X and Y represent independently hydrogen atoms, halogen atoms or monovalent organic groups, and m is 0 or 1, to ring-opening polymerization alone or in combination with at least one monomer copolymerizable with said norbornene derivative, characterized by using, as the hydrogenation catalyst, a ruthenium compound represented by general formula (II):

$$RuH_kQ_nT_pZ_q \quad (II)$$

wherein Q represents a halogen atom, T represents at least one atomic group selected from the group consisting of CO, NO and $CH_3COCH_2COCH_3$, Z represents $PR^1R^2R^3$ ($R^1$, $R^2$ and $R^3$ represent independently alkyl groups, alkenyl groups or phenyl groups), k is 1 or 2, n is 0, 1 or 2, p is 1 or 2, and q is 2 or 3.

The present invention is hereinafter described specifically.

In the present invention, a ring-opening polymer obtained by subjecting a specific monomer or monomers to ring-opening polymerization with a metathesis catalyst is hydrogenated with a hydrogenation catalyst composed of a specific ruthenium compound.

SPECIFIC MONOMER

The specific monomer used as the starting material for obtaining a ring-opening polymer to be hydrogenated by the present process is a compound having a norbornene structure represented by general formula (I).

The specific monomer represented by general formula (I) is preferably a compound of general formula (I) in which X or Y is an organic group having polarity, particularly a group represented by formula (III):

$$-(CH_2)_lCOOR^4 \quad (III)$$

because the polymer obtained therefrom gives a hydrogenation product having a high glass transition temperature and low hygroscopicity.

In formula (III), R4 is a hydrocarbon group of 1-12 carbon atoms, preferably an alkyl group of 1-5 carbon atoms. The smaller the value of l, the higher the glass transition temperature of the resulting polymer becomes. A specific monomer having a group of formula (III) wherein l is 0, is preferable because the monomer is easy to synthesize and the polymer obtained therefrom has a high glass transition temperature.

A and B in general formula (I) are independently alkyl groups of 1-10 carbon atoms, preferably 1-5 carbon atoms, more preferably methyl groups. Particularly, it is preferable that the alkyl group is bonded to the same carbon atom to which the above-mentioned carboxylic acid ester group is attached.

The specific monomers represented by general formula (I) wherein m is 1 are more preferable than those wherein m is 0, because the former can give a polymer having a higher glass transition temperature.

Specific examples of the specific monomers represented by general formula (I) include:
bicyclo[2.2.1]hepto-2-ene,
tetracyclo[4.4.0.1$^{2,5}$.1$^{7,10}$]-3-dodecene,
hexacyclo[6.6.1.1$^{3,6}$.0$^{2,7}$.0$^{9,14}$]-4-heptadecene,
tricyclo[5.2.1.0$^{2,6}$]-8-decene,
pentacyclo[6.5.1.1$^{3,6}$.0$^{2,7}$.0$^{9,13}$]-4-pentadecene,
heptacyclo[8.7.0.1$^{2,9}$.1$^{4,7}$.1$^{11,17}$.0$^{3,8}$.0$^{12,16}$]-5-eicocene,
tricyclo[4.4.0.1$^{2,5}$]-3-decene,
5methoxycarbonylbicyclo[2.2.1]hept-2-ene,
5-methyl-5-methoxycarbonylbicyclo[2.2.1]hept-2-ene,
5-cyanobicyclo[2.2.1]hept-2-ene,
8-methoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
9-methyl-8-methoxycarbonyltetracyclo[4.4.0.1$^{2,5}$.1$^{7,10}$]-3-dodecene, and others.

The above specific monomers are not always used alone, and two or more specific monomers may be subjected to ring-opening copolymerization.

COPOLYMERIZABLE MONOMER

In the present invention, the ring-opening polymer may be a copolymer of the specific monomer represented by general formula (I) and a copolymerizable monomer. Specific examples of the copolymerizable monomer include cycloolefins such as cyclobutene, cyclopentene, cycloheptene, cyclooctene, tricyclo[5.2.1.0$^{2,6}$]-3-decene and the like.

In the present invention, the specific monomer represented by general formula (I) can be polymerized in the presence of an unsaturated hydrocarbon polymer having, in the main chain, carbon-to-carbon double bonds, such as polybutadiene, polyisoprene, styrenebtadiene copolymer, ethylene-porpylene-non-conjugated diene copolymer, polynorbornene or the like. The resulting ring-opening copolymer, when hydrogenated, provides a useful material for resin of high impact resistance.

CATALYST FOR RING-OPENING POLYMERIZATION

The ring-opening polymerization reaction is conducted in the presence of a compound of a platinum group metal such as ruthenium, rhodium, palladium, iridium, platinum or the like, or may be conducted in the presence of a catalyst consisting of a combination of (a) at least one compound selected from the compounds of W, Mo and Re and (b) at least one compound selected from the compounds of the Group IA elements (e.g. Li, Na, K), the Group IIA elements (e.g. Mg, Ca), the Group IIB elements (e.g. Zn, Cd, Hg), the Group IIIA elements (e.g. B, Al), the Group IVA elements (e.g. Si, Sn, Pb) and the Group IVB elements (e.g. Ti, Zr) of the Deming Periodic Table, said compounds each having at least one element-carbon bond or element-hydrogen bond. The above combination catalyst may further comprise (c) an additive as mentioned later, in order to enhance the catalytic activity.

Typical examples of the W, Mo or Re compound appropriate as the component (a) are the compounds described in Japanese Patent Application Kokai No. 1-240517, such as $WCl_6$, $MoCl_5$, $ReOCl_3$ and the like.

Specific examples of the compound appropriate as component (b) include those described in Japanese Patent Application Kokai No. 1-240517, such as n-$C_4H_9Li$, $(C_2H_5)_3Al$, $(C_2H_5)_2AlCl$, LiH and the like.

Typical examples of the additive as component (c) are alcohols, aldehydes, ketones, amines, etc. There can also be used those compounds described as additives in Japanese Patent Application Kokai No. 1-240517.

The proportion of the component (a) to the component (b) is such that the metal atom ratio (a):(b) is 1:1 to 1:20, preferably 1:2 to 1:10.

The proportion of the component (c) to the component (a) is such that the molar ratio (c):(a) is 0.005:1 to 10:1, preferably 0.05:1 to 2:1.

SOLVENT FOR RING-OPENING POLYMERIZATION REACTION

The solvent used in the ring-opening polymerization reaction includes alkanes such as pentane, hexane, heptane, octane, nonane, decane and the like; cycloalkanes such as cyclohexane, cycloheptane, cyclooctane, decalin, norbornane and the like; aromatic hydrocarbons such as benzene, toluene, xylene, ethylbenzene, cumene and the like; halogenated alkanes such as chlorobutane, bromohexane, methylene chloride, dichloroethane, hexamethylene dibromide and the like; halogenated benzenes such as chlorobenzene and the like; saturated carboxylic acid esters such as ethyl acetate, n-butyl acetate, iso-butyl acetate, methyl propionate and the like; ethers such as dibutyl ether, tetrahydrofuran, dimethoxyethane and the like; and so forth. Of these, aromatic hydrocarbons are preferable.

MOLECULAR WEIGHT OF RING-OPENING POLYMER

In the present invention, the ring-opening polymer to be hydrogenated, preferably has a molecular weight falling within the intrinsic viscosity ($\eta_{inh}$) range of 0.2–5.0 dl/g. The ring-opening polymer further has a polystyrene-reduced number-average molecular weight (Mn) of ordinarily $0.8 \times 10^4$ to $10 \times 10^4$, preferably $1.5 \times 10^4$ to $8.0 \times 10^4$, more preferably $2.0 \times 10^4$ to $6.0 \times 10^4$; a polystyrene-reduced weightaverage molecular weight (Mw) of ordinarily $2.5 \times 10^4$ to $3.0 \times 10^5$, preferably $3.0 \times 10^4$ to $2.5 \times 10^5$, more preferably $4.0 \times 10^4$ to $2.0 \times 10^5$; and a molecular weight distribution (Mw/Mn) of ordinarily 1.5–4.5, preferably 1.5–4.0, more preferably 1.5–3.5.

In general, the higher the molecular weight, the more difficult the obtaining of a high hydrogenation degree becomes. According to the present invention, even a polymer of high molecular weight can be relatively easily hydrogenated in a high hydrogenation degree.

While the molecular weight of ring-opening polymer can be controlled also by varying the polymerization temperature, the type of catalyst and the type of solvent, it is more preferable to control the molecular weight by allowing an α-olefin (e.g. 1-butene, 1-pentene, 1-hexene, 1-octene) to coexist in the reaction system and appropriately varying the amount thereof.

Besides, an aromatic vinyl compound, a vinyl cyanide compound, a (meth)acrylic acid ester, a diene compound or the like can be used as a molecular weight modifier.

For controlling the molecular weight of the ring-opening polymer, it is also possible to add the specific monomer gradually to the reaction system during the ring-opening polymerization of the specific monomer.

HYDROGENATION CATALYST

The hydrogenation catalyst used in the present invention is a ruthenium compound represented by general formula (II). Accordingly, metallic ruthenium itself and metallic ruthenium supported on a porous carrier are not used in the present invention.

In general formula (II), Q is at least one halogen atom selected from the group consisting of fluorine atom, chlorine atom, bromine atom and iodine atom, and particularly, a chlorine atom is preferred.

T represents at least one atomic group selected from the group consisting of CO, NO and $CH_3COCH_2COCH_3$, and particularly CO is preferred.

Z is $PR^1R^2R^3$ ($R^1$, $R^2$ and $R^3$, which may be the same or different, represent alkyl groups such as ethyl, butyl, hexyl and the like, alkenyl groups such as vinyl, allyl and the like, or phenyl groups). Such $PR^1R^2R^3$ that $R^1$, $R^2$ and $R^3$ are all phenyl groups is particularly preferable as Z.

k is 1 or 2; n is 0, 1 or 2; p is 1 or 2; and q is 2 or 3.

In the present invention, specific examples of the ruthenium compound which can be used appropriately as the hydrogenation catalyst, include
$RuHCl(CO)[P(C_6H_5)_3]_3$,
$RuHCl(CO)[P(C_6H_4CH_3)_3]_3$,
$RuHCl(CO)[P(C_6H_3(CH_3)_2]_3]_3$,
$RuHCl(CO)[P(C_4H_9)_3]_3$,
$RuH_2(CO)[P(C_6H_5)_3]_3$,
$RuH_2(CO)_2[P(C_6H_5)_3]_2$,
$RuH(NO)[P(C_6H_5)_3]_3$,
$RuH(NO)[P(C_6H_4CH_3)_3]_3$ and
$RuHCl(CH_3COCH_2COCH_3)[P(C_6H_5)_3]_3$.

Of these, $RuHCl(CO)[P(C_6H_5)_3]_3$ is preferable.

In the present invention, these ruthenium compounds need not be pure and may contain impurities. Process for the synthesis of these ruthenium compounds are described in "INORGANIC SYNTHESIS" or "J. CHEM. SOC. DALTON TRAN S., 1973, 1912". For example, $RuHCl(CO)[P(C_6H_5)_3]_3$ can be synthesized by heating under reflux given amounts of triphenylphosphine, ruthenium chloride ($RuCl_3 \cdot nH_2O$) and formalin in methyl cellosolve (solvent) (Inorganic Synthesis, Vol. 15, p. 45).

In the present invention, the amount of the hydrogenation catalyst used is 2–500 ppm, preferably 10–500 ppm, more preferably 15–300 ppm, particularly preferably 20–200 ppm, in terms of metallic ruthenium concentration, of the polymer to be hydrogenated. When said amount is less than 2 ppm, the reaction rate is low. When the amount is more than 500 ppm, it is impossible to obtain an effect proportional to said amount, and the sufficient recovery of the catalyst added to the system is difficult, resulting in a high production cost.

In the present invention, a ruthenium compound may be previously and separately prepared and then added as such, or the raw materials necessary for preparing the ruthenium compound may be added to the reaction system.

SOLVENT FOR HYDROGENATION REACTION

The hydrogenation reaction according to the present invention can be carried out without using any solvent when the ring-opening polymer to be hydrogenated is liquid, or meltable at relatively low temperatures. Usually, however, the ring-opening polymer is dissolved in a solvent and the resulting solution is subjected to hydrogenation reaction.

Since the hydrogenation catalyst used in the present process is such that the catalytic activity is not affected by the type of the solvent used, any solvent can be used in the present invention as the solvent for hydrogenation reaction as long as it can dissolve the ring-opening polymer to be hydrogenated and is not hydrogenated itself.

Specifically, those solvents mentioned above as the solvent for ring-opening polymerization reaction can be used as the solvent for hydrogenation reaction. Of said solvents, preferable are aromatic hydrocarbons; particularly, xylene, ethylbenzene and a mixture thereof.

The concentration of the ring-opening polymer solution to be subjected to hydrogenation reaction is not critical. However, the concentration is preferably 1–80% by weight, more preferably 5–50% by weight, particularly preferably 10–40% by weight. In general, when the concentration of the ring-opening polymer solution is low, the process is disadvantageous economically, and when the concentration is too high, the solution viscosity becomes high, so that the reaction rate tends to be lowered. In the present invention, however, the hydrogenation is relatively easy even at a high polymer concentration.

HYDROGENATION REACTION

The temperature of hydrogenation reaction is ordinarily 0°–200° C., preferably 60°–180° C., more preferably 80°–170° C. When the temperature is low, it is impossible to obtain a high reaction rate. When the temperature is too high, there is a fear that the catalyst may be deactivated.

The pressure of the reaction system is ordinarily 1–200 kg/cm$^2$, preferably 2–150 kg/cm$^2$, more preferably 5–120 kg/cm$^2$ When the pressure is too low, it is impossible to obtain a high reaction rate. When the pressure is high, a high reaction rate can be obtained but an expensive pressure apparatus is required.

The time required for the hydrogenation may be varied depending upon the hydrogenation pressure, the concentration of ring-opening polymer, etc; however, a period of 10 minutes to 100 hours is selected.

The hydrogenation catalyst used in the present invention is not poisoned by the ring-opening polymerization catalyst when the latter consists of (a) at least one compound selected from the compounds of tungsten, molybdenum and titanium and (b) at least one compound selected from the group consisting of organoaluminums, organolithiums and organotins. Therefore, when such a ring-opening polymerization catalyst is used, it is possible to adopt such a procedure that the hydrogenation catalyst is added directly to the polymer solution after ring-opening polymerization reaction to effect the hydrogenation reaction and, after completion of the hydrogenation reaction, the ring-opening polymerization catalyst and the hydrogenation catalyst are removed simultaneously. This procedure is suitable for industrial practice because it enables omission of such steps as removal of ring-opening polymerization catalyst from polymer solution, recovery of ring-opening polymer, dissolution of ring-opening polymer in solvent, and the like.

When the hydrogenation catalyst is not poisoned by the ring-opening polymerization catalyst, the polymer solution after ring-opening polymerization reaction can be subjected to hydrogenation reaction as it is, as mentioned above, without a reduction in hydrogenation degree; however, when the hydrogenation reaction is conducted at high temperatures, an increase in molecular weight of polymer takes place during the hydrogenation reaction in some cases. Therefore, it is preferable to first add an active hydrogen compound to the polymer solution obtained by the ring-opening polymerization reaction and subsequently add the hydrogenation catalyst.

As the active hydrogen compound, there can be preferably used water, an alcohol, a phenol, an amine, a carboxylic acid, an inorganic acid or the like. An alcohol and an amine are particularly preferable.

The amount of the active hydrogen compound added is ordinarily 0.1–1,000 equivalents, preferably 0.5–500 equivalents, more preferably 1–100 equivalents, per equivalent of the metal of the ring-opening polymerization catalyst. When the amount is too large, the activity of hydrogenation is reduced in some cases.

REMOVAL OF HYDROGENATION CATALYST

After completion of the hydrogenation reaction, the hydrogenation catalyst can be separated and removed from the reaction mixture by a known means such as adsorption on adsorbent, washing with water or a lower alcohol in the presence of an organic acid and/or an inorganic acid, or the like. In the present invention, however, the hydrogenation catalyst is removed preferably by a method comprising the following steps (1) to (3) (the method is referred to hereinafter as "the heating method"):

(1) the step of adding a poor solvent for the hydrogenation product of ring-opening polymer to the polymer solution consisting of the hydrogenation product and a good solvent for the hydrogenation product, (2) the step of heating the resulting system to a temperature at which the whole system forms a homogeneous phase, and (3) the step of cooling this system to separate it into a polymer-containing phase and a polymer-free phase and then recovering the hydrogenation product of ring-opening polymer from the polymer-containing phase.

In the present invention, the good solvent for hydrogenation product of ring-opening polymer means such a solvent that when the hydrogenation product has been dissolved in the solvent in a saturated state at room temperature the concentration of the resulting solution is at least 5% by weight and the poor solvent for hydrogenation product of ring-opening polymer means such a solvent that when the hydrogenation product has been dissolved in the solvent in a saturated state at room temperature the concentration of the resulting solution is less than 5% by weight.

As the good solvent for hydrogenation product, there can be used, for example, the above-mentioned solvents for ring-opening polymerization reaction and the above-mentioned solvents for hydrogenation reaction. Of them, aromatic hydrocarbon compounds, cyclic ether compounds and carboxylic acid esters are preferable as the good solvent.

Meanwhile, as the poor solvent for hydrogenation product, there can be used, for example, aliphatic hydrocarbon compounds such as hexane, heptane, octane, nonane, decane, undecane, dodecane and the like; lower alcohol esters of lower carboxylic acids such as methyl formate, ethyl formate, methyl acetrate, ethyl acetate and the like; lower alkyl ketones such as acetone, methyl ethyl ketone and the like; lower alcohols such as methanol, ethanol, propanol, butanol, pentanol, hexanol and the like; and mixtures thereof. Of them, lower alkyl ketones and lower alcohols are preferable as the poor solvent.

The poor solvent for hydrogenation product must be able to dissolve the metal-containing catalyst residue.

In view of the above, specific examples of the preferable combination of the good solvent and the poor solvent used in the present invention include those combinations that the good solvent is selected from the group consisting of aromatic hydrocarbon compounds (e.g. toluene, xylene), cyclic ether compounds (e.g. tetrahydrofuran, dioxane) and carboxylic acid esters (e.g. n-butyl acetate, isobutyl acetate) and the poor solvent is selected from the lower alcohols (e.g. methanol, ethanol, propanol).

Of these, particularly preferable is a combination wherein the good solvent is toluene, xylene, tetrahydrofuran or n-butyl acetate and the poor solvent is methanol, because the recovery of the solvents used is easy and economically advantageous.

In the present invention, the weight ratio of the hydrogenation product to be purified to the good solvent (the hydrogenation product:the good solvent) is 50:50 to 5:95, preferably 30:70 to 10:90. In this case, it is preferable that the hydrogenation product is completely dissolved in the solvent to form a homogeneous polymer solution.

The weight ratio of the good solvent to the poor solvent (the good solvent:the poor solvent) is 90:10 to 10:90. When the proportion of the good solvent is too large, the recovery of the hydrogenation product is significantly low. When the proportion of the poor solvent is too large, the efficiency of extraction of the metal-containing catalyst residue is low, so that the effect of purification of the hydrogenation product becomes low.

When the good solvent is toluene, xylene or n-butyl acetate and the poor solvent is methanol, the weight ratio of the good solvent to the poor solvent is preferably 70:30 to 30:70, more preferably 60:40 to 40:60.

In the present invention, the poor solvent is added to the polymer solution; the resulting system is heated to a temperature at which the whole system forms a homogeneous phase; then, the system is cooled to separate it into two phases, namely a polymer-containing phase and a polymer-free phase; and the desired hydrogenation product is recovered from the polymercontaining phase.

The temperature to which the system formed by adding the poor solvent to the above-mentioned polymer solution is heated, is a temperature at which the whole system forms a homogeneous phase. The temperature is ordinarily 200° C or below, preferably 150° C or below, more preferably 130° C or below.

The heating time is ordinarily 1 minute to 10 hours, preferably 10 minutes to 2 hours. The system is preferably stirred during heating.

When the metathesis ring-opening polymerization reaction or the hydrogenation reaction is followed by a purification treatment, if the temperature of the polymerization mixture obtained is equal to or higher than a temperature at which the above-mentioned polymer solution and the poor solvent becomes a homogeneous phase, it is sufficient that the poor solvent is added to the polymerization mixture and heating step can be omitted.

After completion of the heating, the system is cooled to separate it into two phases, i.e. a polymer-containing phase and a polymer-free phase.

The cooling temperature is ordinarily −20° to −60° C., preferably 0°–50° C., more preferably 10°–40° C. In the cooling, the system may be stirred.

By the above procedure, the metal compound components contained in the hydrogenation product of ring-opening polymer are transferred, by extraction, to the polymer-free phase at a high separation efficiency; as a result, the polymer-containing phase contains the metal compound components in a very low concentration.

After the removal of the polymer-free phase, it is possible to further add the good solvent and the poor solvent to the polymer-containing phase and repeat the above procedure, whereby the resulting polymer-containing phase contains the metal compound components in a still lower concentration.

In order to separate and recover the hydrogenation product of ring-opening polymer from the reaction mixture, there can be used a method conventionally employed in recovering a polymer from a solution thereof, as it is. The method includes, for example, a steam coagulation method wherein a reaction mixture is contacted directly with steam, a method wherein a poor solvent is added to a reaction mixture to precipitate a polymer, a method wherein a reaction mixture is heated in a vessel to remove the solvent by distillation, and a method wherein solvent removal and pelletiation are simultaneously conducted using a vented-extruder. An appropriate method can be used depending upon, for example, the desired hydrogenation product of ring opening polymer and the properties of the solvent used.

To the hydrogenation product of ring-opening polymer obtained according to the present invention can be added various additives such as antioxidant ultraviolet absorber, lubricant, coloring agent, pigment and the like depending upon the application purpose. The method of addition of additives is not critical and includes addition to polymer solution after hydrogenation reaction, addition during pelletization of hydrogenation product of ring-opening polymer, etc.

The hydrogenation product of ring-opening polymer obtained according to the present invention has good heat resistance, weather resistance and ozone resistance, and can be used in a wide variety of applications, for example, production of optical materials (e.g. lens, optical disk substrate, optical fiber), window glass, automobile glass, film and sheet and production of various molded articles as general molding materials.

The present invention is hereinafter described referring to Examples. However, the present invention should not be interpreted to be restricted to the Examples.

In the following, the value of hydrogenation degree was calculated based on the extent of decrease, by hydrogenation reaction, of the peak attributed to the carbon-to-carbon double bond at $\delta=4.5$–$6.0$ ppm in the NMR absorption spectrum measured at 100 MHz.

Intrinsic viscosity was measured at a concentration of 0.5 g/dl in chloroform, at 30° C.

PRODUCTION OF RING-OPENING POLYMERS

Synthesis Example 1

In a reactor purged with a nitrogen gas were placed 500 g of 8-methyl-8-methoxycarbonyltetracyclo[4.4.0.1$^{2,5}$.1$^{7,10}$]-3-dodecene as a specific monomer, 1,700 ml of toluene, 83 g of 1-hexene as a molecular weight modifier, and, as a ring-opening polymerization catalyst, 8.5 ml of a chlorobenzene solution of WCl$_6$ (concentration: 0.05 M/liter), 4.3 ml of a 1,2-dichloroethane solution of paraldehyde (concentration: 0.1 M/liter) and 11 ml of a toluene solution of diethylaluminum chloride (concentration: 0.8 M/liter). The resulting mixture was subjected to ring-opening polymerization reaction at 60° C. for 4 hours to obtain a polymer solution of 24 weight % concentration (referred to hereinafter as Polymer Solution 1).

Polymer Solution 1 was placed in a large amount of methanol to precipitate the ring-opening polymer. The polymer was crushed, filtered, washed and dried to obtain 492 g of the ring-opening polymer (referred to hereinafter as Ring-Opening Polymer 1).

Synthesis Example 2

The same procedure as in Synthesis Example 1 was repeated, except that the toluene used in Synthesis Example 1 was replaced by mixed xylene, to obtain a polymer solution. To the solution was added 5 g of methanol to obtain a polymer solution of 24 weight % concentration (referred to hereinafter as Polymer Solution 2).

Synthesis Example 3

In a reactor purged with a nitrogen gas were placed 350 g of tetracyclo[4.4.0.1$^{2,5}$.1$^{7,10}$]-3-dodecene as a specific monomer, 150 g of pentacyclo[6.5.1.1$^{3,6}$.0$^{2,7}$.0$^{9,13}$]-4-pentadecene as another specific monomer, 2,000 ml of toluene, 7.5 ml of 1-hexene as a molecular weight modifier, and, as a ring-opening polymerization catalyst, 15 ml of a toluene solution of TiCl$_4$ (concentration: 1.0 M/liter), 20 ml of a toluene solution of triethylamine (concentration: 0.1 M/liter) and 80 ml of a toluene solution of triethylaluminum (concentration: 1.0 M/liter). The resulting mixture was subjected to ring-opening polymerization reaction at 25° C. for 2.5 hours to obtain a polymer solution of 24 weight % concentration.

The polymer solution thus obtained was placed in a large amount of methanol to precipitate the ring-opening polymer. The polymer was crushed, filtered, washed and dried to obtain 260 g of the ring-opening polymer (referred to hereinafter as Ring-Opening Polymer 2).

Synthesis Example 4

The same procedure as in Synthesis Example 1 was repeated, except that 450 g of 8-methyl-8-methoxycarbonyltetracyclo[4.4.0.1$^{2,5}$.1$^{7,10}$]-3-dodecene and 50 g of 5-methyl-5-methoxycarbonylbicyclo[2.2.1]hept-2-ene were used as the specific monomers to obtain 490 g of a ring-opening polymer (referred to hereinafter as Ring-Opening Polymer 3).

Synthesis Example 5

The same procedure as in Synthesis Example 1 was repeated, except that 450 g of 8-methyl-8-methoxycarbonyltetracyclo[4.4.0.1$^{2,5}$.1$^{7,10}$]-3-dodecene and 50 g of dicyclopentadiene were used as the specific monomers, to obtain 490 g of a ring-opening polymer (referred to hereinafter as Ring-Opening Polymer 4).

Synthesis Example 6

The same procedure as in Synthesis Example 1 was repeated, except that the toluene used in Synthesis Example 1 was changed to mixed xylene and the amount of 1-hexene used was changed to 70 g, to obtain a polymer solution. To the polymer solution was added 5 g of methanol to obtain a polymer solution of 24 weight % concentration (referred to hereinafter as Polymer Solution 3).

Synthesis Example 7

The same procedure as in Synthesis Example 1 was repeated, except that the toluene used in Synthesis Example 1 was changed to mixed xylene and the amount of 1-hexene used was changed to 60 g, to obtain a polymer solution. To the polymer solution was added 5 g of methanol to obtain a polymer solution of 24 weight % concentration (referred to hereinafter as Polymer Solution 4).

PRODUCTION OF HYDROGENATION PRODUCT

Example 1

In 320 g of toluene was dissolved 80 g of Ring-Opening Polymer 1 obtained in Synthesis Example 1 to prepare a polymer solution of 20 weight % concentration. The polymer solution was placed in a high-pressure autoclave provided with a stirrer of electromagnetic induction type. Thereto was added, as a hydrogenation catalyst, 75 mg of a ruthenium compound RuHCl(CO)[P(C$_6$H$_5$)$_3$]$_3$ prepared according to "INORGANIC SYNTHESIS, VOL. 15".

A hydrogen gas was introduced into the high-pressure autoclave. Then, the temperature of the contents was elevated to 165° C with stirring. The pressure at this temperature was 40 kg/cm2. The contents were kept at this temperature for 4 hours to carry out hydrogenation reaction. The temperature was returned to room temperature and the hydrogen gas was released, after which the reaction mixture was coagulated with a hydrochloric acid-methanol solution. The coagulation product was vacuum-dried to obtain a hydrogenation product of ring-opening polymer.

The results of measurement are shown in Table 1.

Example 2

The same procedure as in Example 1 was repeated, except that the solution of Ring-Opening Polymer 1 used in Example 1 was replaced by 400 g of Polymer Solution 1 obtained in Synthesis Example 1 and the amount of the hydrogenation catalyst used was changed to 38 mg, to obtain a hydrogenation product of ring-opening polymer.

The results of measurement are shown in Table 1.

Example 3

The same procedure as in Example 1 was repeated, except that the solution of Ring-Opening Polymer 1 used in Example 1 was replaced by 400 g of Polymer Solution 2 obtained in Synthesis Example 2 and the amount of the hydrogenation catalyst used was changed to 38 mg, to obtain a hydrogenation product of ring-opening polymer.

The results of measurement are shown in Table 1.

Example 4

The same procedure as in Example 1 was repeated, except that the solution of Ring-Opening Polymer 1 used in Example 1 was replaced by 60 g of the solution of Ring-Opening Polymer 2 obtained in Synthesis Example 3, to obtain a hydrogenation product of ring-opening polymer.

The results of measurement are shown in Table 1.

Example 5

The same procedure as in Example 1 was repeated, except that the Ring-Opening Polymer 1 used in Example 1 was replaced by 80 g of Ring-Opening Polymer 3 obtained in Synthesis Example 4, the toluene as a hydrogenation reaction solvent was replaced by mixed xylene, the temperature of hydrogenation reaction was changed to 100° C and the time of hydrogenation reaction was changed to 12 hours, to obtain a hydrogenation product of ring-opening polymer.

The results of measurement are shown in Table 1.

Example 6

The same procedure as in Example 1 was repeated, except that the Ring-Opening Polymer 1 used in Example 1 was replaced by 80 g of Ring-Opening Polymer 4 obtained in Synthesis Example 5, the toluene as a hydrogenation reaction solvent was replaced by mixed xylene, the temperature of hydrogenation reaction was changed to 120° C. and the time of hydrogenation reaction was changed to 6 hours, to obtain a hydrogenation product of ring-opening polymer.

The results of measurement are shown in Table 1.

Example 7

The same procedure as in Example 1 was repeated, except that the solution of Ring-Opening Polymer 1 used in Example 1 was replaced by 400 g of Polymer Solution 3 obtained in Synthesis Example 6, to obtain a hydrogenation product of ring-opening polymer.

The results of measurement are shown in Table 1.

Example 8

The same procedure as in Example 1 was repeated, except that the solution of Ring-Opening Polymer 1 used in Example 1 was replaced by a solution consisting of 250 g of Polymer Solution 4 obtained in Synthesis Example 7 and 150 g of mixed xylene and the amount of the ruthenium compound used was changed to 47 mg, to obtain a hydrogenation product of ring-opening polymer.

The results of measurement are shown in Table 1.

Example 9

The same procedure as in Example 3 was repeated, except that 36 mg of a ruthenium compound $RuH_2(CO)[P(C_6H_5)_3]_3$ was used as the hydrogenation catalyst, to obtain a hydrogenation product of ring-opening polymer.

The results of measurement are shown in Table 1.

Example 10

The same procedure as in Example 3 was repeated, except that 81 mg of a ruthenium compound $RuHCl(CH_3COCH_2COCH_3)[P(C_6H_5)_3]_3$ was used as the hydrogenation catalyst, to obtain a hydrogenation product of ring-opening polymer.

The results of measurement are shown in Table 1.

Example 11

The same procedure as in Example 3 was repeated, except that 73 mg of a ruthenium compound $RuH(NO)[P(C_6H_5)_3]_3$ was used as the hydrogenation catalyst to obtain a hydrogenation product of ring-opening polymer.

The results of measurement are shown in Table 1.

Comparative Examples 1–5

The same procedure as in Example 3 was repeated, except that 75 mg (Comparative Example 1), 54 mg (Comparative Example 2), 73 mg (Comparative Example 3), 75 mg (Comparative Example 4) or 17 mg (Comparative Example 5) of a ruthenium compound as shown in Table 1 was used as the hydrogenation catalyst, to obtain hydrogenation products of ring-opening polymers.

The results of measurement are shown in Table 1.

Comparative Example 6

The same procedure as in Example 3 was repeated, except that 4 g of 5 wt.% palladium supported on active carbon which was a commercially available hydrogenation catalyst (manufactured by N.E. Chemcat, Co., Ltd.) and corresponded to a palladium amount of 2100 ppm of the ring-opening polymer to be hydrogenated was substituted for the ruthenium compound as a hydrogenation catalyst, to obtain a hydrogenation product of ring-opening polymer.

The hydrogenation degree of the hydrogenation product obtained was 38.4%, and most of the xylene used as a solvent was also hydrogenated.

Comparative Example 7

The same procedure as in Example 1 was repeated, except that the Ring-Opening Polymer 1 used in Example 1 was replaced by 80 g of a butadiene rubber [cis-1,4 content=98%, $ML_{1+4}(100°\ C.)=37$], to obtain a hydrogenation product of polymer.

The results of measurement are shown in Table 1.

Comparative Example 8

The same procedure as in Example 1 was repeated, except that the Ring-Opening Polymer 1 used in Example 1 was replaced by 80 g of an acrylonitrilebutadiene rubber [acrylonitrile content=39%, $ML_{1+4}(100°\ C.)=50$] and the hydrogenation reaction solvent (toluene) was changed to acetone, to obtain a hydrogenation product of polymer.

The results of measurement are shown in Table 1.

TABLE 1

| | Hydrogenation catalyst | | Conditions of hydrogenation reaction | |
|---|---|---|---|---|
| | Ruthenium compound | Concentration (ppm) | Temperature (°C.) | Pressure (kg/cm$^2$) |
| Example 1 | $RuHCl(CO)[P(C_6H_5)_3]_3$ | 100 | 165 | 40 |
| Example 2 | $RuHCl(CO)[P(C_6H_5)_3]_3$ | 42 | 165 | 40 |

TABLE 1-continued

| | | | | |
|---|---|---|---|---|
| Example 3 | RuHCl(CO)[P(C$_6$H$_5$)$_3$]$_3$ | 42 | 165 | 40 |
| Example 4 | RuHCl(CO)[P(C$_6$H$_5$)$_3$]$_3$ | 133 | 165 | 40 |
| Example 5 | RuHCl(CO)[P(C$_6$H$_5$)$_3$]$_3$ | 100 | 100 | 40 |
| Example 6 | RuHCl(CO)[P(C$_6$H$_5$)$_3$]$_3$ | 100 | 120 | 40 |
| Example 7 | RuHCl(CO)[P(C$_6$H$_5$)$_3$]$_3$ | 84 | 165 | 40 |
| Example 8 | RuHCl(CO)[P(C$_6$H$_5$)$_3$]$_3$ | 84 | 165 | 40 |
| Example 9 | RuH$_2$(CO)[P(C$_6$H$_5$)$_3$]$_3$ | 42 | 165 | 40 |
| Example 10 | RuHCl(CH$_3$COCH$_2$COCH$_3$)[P(C$_6$H$_5$)$_3$]$_3$ | 84 | 165 | 40 |
| Example 11 | RuH(NO)[P(C$_6$H$_5$)$_3$]$_3$ | 84 | 165 | 40 |
| Comparative Example 1 | RuCl$_2$[P(C$_6$H$_5$)$_3$]$_3$ | 84 | 165 | 40 |
| Comparative Example 2 | Ru(CO)$_2$[P(C$_6$H$_5$)$_3$]$_3$ | 61 | 165 | 40 |
| Comparative Example 3 | RuHCl[P(C$_6$H$_5$)$_3$]$_3$ | 84 | 165 | 40 |
| Comparative Example 4 | RuH(CH$_3$COO)[P(C$_6$H$_5$)$_3$]$_3$ | 84 | 165 | 40 |
| Comparative Example 5 | Ru(CH$_3$COO)$_2$ | 84 | 165 | 40 |
| Comparative Example 7 | RuHCl(CO)[P(C$_6$H$_5$)$_3$]$_3$ | 100 | 165 | 40 |
| Comparative Example 8 | RuHCl(CO)[P(C$_6$H$_5$)$_3$]$_3$ | 100 | 165 | 40 |

| | Ring-opening polymer or polymer solution | Intrinsic Viscosity ($\eta_{inh}$) (dl/g) Before hydrogenation | After hydrogenation | Hydrogenation degree (%) |
|---|---|---|---|---|
| Example 1 | Ring Opening Polymer 1 | 0.45 | 0.45 | 99.7 |
| Example 2 | Polymer Solution 1 | 0.46 | 0.50 | 99.3 |
| Example 3 | Polymer Solution 2 | 0.46 | 0.48 | 99.4 |
| Example 4 | Ring Opening Polymer 2 | 0.47 | 0.47 | 99.4 |
| Example 5 | Ring Opening Polymer 3 | 0.51 | 0.51 | 98.8 |
| Example 6 | Ring Opening Polymer 4 | 0.54 | 0.54 | 99.4 |
| Example 7 | Polymer Solution 3 | 0.85 | 0.85 | 99.5 |
| Example 8 | Polymer Solution 4 | 1.15 | 1.15 | 99.3 |
| Example 9 | Polymer Solution 2 | 0.46 | 0.46 | 99.0 |
| Example 10 | Polymer Solution 2 | 0.46 | 0.46 | 98.3 |
| Example 11 | Polymer Solution 2 | 0.46 | 0.46 | 98.5 |
| Comparative Example 1 | Polymer Solution 2 | 0.46 | 0.47 | 50.6 |
| Comparative Example 2 | Polymer Solution 2 | 0.46 | 0.47 | 12.8 |
| Comparative Example 3 | Polymer Solution 2 | 0.46 | — | 28.3 |
| Comparative Example 4 | Polymer Solution 2 | 0.46 | — | 43.5 |
| Comparative Example 5 | Polymer Solution 2 | 0.46 | — | 8.0 |
| Comparative Example 7 | BR[*1] | 0.46 | — | 21.0 |
| Comparative Example 8 | NBR[*2] | 0.46 | — | 18.7 |

Note:
[*1] Butadiene rubber
[*2] Acrylonitrile-butadiene rubber

Reference Example

In a reactor was placed 250 g of a xylene solution containing 20% by weight of the hydrogenation product of ring-opening polymer obtained in Example 7, and 130 g of methanol was added thereto. The resulting mixture was heated with stirring at 80° C. for 30 minutes to form a homogeneous phase, and thereafter, cooled to room temperature to separate it into a polymer-containing phase and a polymer-free phase. From the polymer-containing phase was recovered the hydrogenation product of ring-opening polymer, and the contents of aluminum and ruthenium of the hydrogenation product were determined by an atomic absorption analysis and the content of tungsten of the hydrogenation product was determined by a colorimetry to find that the contents of aluminum, ruthenium and tungsten were 57 ppm, 26 ppm and 51 ppm, respectively. Before heating the mixture of the xylene solution and methanol, the contents of these metals were 490 ppm of aluminum, 96 ppm of ruthenium and 163 ppm of tungsten.

As appreciated from Table 1, the process of the present invention enables one to hydrogenate even a ring-opening polymer of a tetracyclododecene compound having a large atomic group in the vicinity of the carbon-to-carbon double bond, with a very small amount of a hydrogenation catalyst in a very high hydrogenation degree, and carry out the hydrogenation reaction very smoothly without causing gelation of the ring-opening polymer solution.

Taking into consideration that (a) the ring-opening polymer to be hydrogenated in the present invention has high steric hindrance due to the presence of a bulky tricyclododecane ring and cannot be hydrogenated in a high hydrogenation degree according to any conventional method, (b) the hydrogenation catalyst used in the present invention exhibits only a low activity in the hydrogenation reaction of a polymer of a conjugated diene compound having a relatively simple structure when used in a large amount, and (c) the hydrogenation degree obtained in the present invention is very strict because it is calculated using the NMR absorption spectrum measured at 100 MHz, the high hydrogenation degree obtained in the present invention is quite surprising.

According to the process of the present invention, owing to the use of a hydrogenation catalyst consisting of a specific ruthenium compound, even a ring-opening polymer of a specific tetracyclododecene compound can be hydrogenated with a small amount of said hydrogenation catalyst in a very high hydrogenation degree, and the hydrogenation reaction can be carried out easily. Even when said ring-opening polymer to be hydrogenated is in solution, the gelation of the solution is inhibited, which enable a high-concentration solution of said ring-opening polymer to be subjected to hydrogenation reaction. In this respect, too, the hydrogenation reaction can be conducted at a high efficiency with an industrial advantage.

What is claimed is:

1. A process for producing a hydrogenation product of ring-opening polymer by hydrogenating, in the presence of a hydrogenation catalyst, the non-aromatic carbon-to-carbon double bond present in a ring-opening polymer obtained by subjecting to ring-opening polymerization at least one norbornene derivative represented by general formula (I):

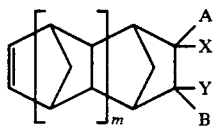 (I)

wherein A and B independently represent hydrogen atoms or hydrocarbon groups having 1–10 carbon atoms, X and Y independently represent hydrogen atoms, halogen atoms or monovalent organic groups, and m is 0 or 1, alone or in combination with a monomer copolymerizable with said norbornene derivative, characterized by using, as the hydrogenation catalyst, a ruthenium compound represented by general formula (II):

$$RuH_kQ_nT_pZ_q \qquad (II)$$

wherein Q represents a halogen atom, T represents at least one atomic group selected from the group consisting of CO, NO and CH$_3$COCH$_2$COCH$_3$, Z represents PR$^1$R$^2$R$^3$ (R$^1$, R$^2$ and R$^3$ independently represent alkyl groups, alkenyl groups or phenyl groups), k is 1 or 2, n is 0, 1 or 2, p is 1 or 2, and q is 2 or 3.

2. The process according to claim 1, wherein Q of general formula (II) is at least one member selected from the group consisting of fluorine atom, chlorine atom, bromine atom and iodine atom.

3. The process according to claim 1, wherein Q of general formula (II) is a chlorine atom.

4. The process according to claim 1, wherein T of general formula (II) is an atomic group represented by CO.

5. The process according to claim 1, wherein Z of general formula (II) is an atomic group represented by P(C$_6$H$_5$)$_3$.

6. The process according to claim 1, wherein the ruthenium compound represented by general formula (II) is at least one compound selected from the group consisting of
RuHCl(CO)[P(C$_6$H$_5$)$_3$]$_3$,
RuHCl(CO)[P(C$_6$H$_4$CH$_3$)$_3$]$_3$,
RuHCl(CO)[P(C$_6$H$_3$(CH$_3$)$_2$)$_3$]$_3$,
RuHCl(CO)[P(C$_4$H$_9$)$_3$]$_3$,
RuH$_2$(CO)[P(C$_6$H$_5$)$_3$]$_3$,
RuH$_2$(CO)$_2$[P(C$_6$H$_5$)$_3$]$_2$,
RuH(NO)[P(C$_6$H$_5$)$_3$]$_3$,
RuH(NO)[P(C$_6$H$_4$CH$_3$)$_3$]$_3$ and
RuHCl(CH$_3$COCH$_2$COCH$_3$)[P(C$_6$H$_5$)$_3$]$_3$.

7. The process according to claim 1, wherein the ruthenium compound represented by general formula (II) is used in a proportion of 2–500 ppm, in terms of ruthenium metal concentration, of the ring-opening polymer to be hydrogenated.

8. The process according to claim 1, wherein the concentration of the ring-opening polymer to be hydrogenated, in the reaction system is 1–80% by weight.

9. The process according to claim 1, wherein X or Y of general formula (I) is an organic group having a polarity.

10. The process according to claim 1, wherein X or Y of general formula (I) is a group represented by —(CH$_2$)lCOOR$_4$ (R$^4$ represents a hydrocarbon group having 1–12 carbon atoms, and l represents 0, 1 or 2).

11. The process according to claim 1, wherein A or B of general formula (I) is an alkyl group having 1–5 carbon atoms.

12. The process according to claim 1, wherein the norbornene derivative represented by general formula (I) is at least one member selected from the group consisting of 8-methyl-8-methoxycarbonyltetracyclo[4.4.0.1$^{2,5}$.1$^{7,10}$]-3-dodecene and 8-methoxycarbonyltetracyclo[4.4.0.1$^{2,5}$.1$^{7,10}$]-3-dodecene.

13. The process according to claim 1, wherein a purification treatment comprising the following steps (1)–(3) is conducted after the hydrogenation:
(1) the step of adding a poor solvent for the hydrogenation product of ring-opening polymer to a polymer solution consisting of said hydrogenation product and a good solvent for said hydrogenation product,
(2) the step of heating the system obtained in the step (1) to a temperature at which said polymer solution and the poor solvent for said hydrogenation product form a homogeneous phase, and
(3) the step of cooling this system to separate it into a polymer-containing phase and a polymer-free phase and then recovering a hydrogenation product of ring-opening polymer from the polymer-containing phase.

* * * * *